(12) United States Patent
Ramaekers et al.

(10) Patent No.: US 11,197,478 B2
(45) Date of Patent: Dec. 14, 2021

(54) METHOD OF CONTROLLING ANTHRACNOSE ON TROPICAL FRUIT PLANTS

(71) Applicant: Arysta LifeScience Inc., Cary, NC (US)

(72) Inventors: Lara Ramaekers, Orp-Le-Grand (BE); Maurilio Flores Lopez, County Del Valle (MX)

(73) Assignee: ARYSTA LIFESCIENCE INC., Cary, NC (US)

( * ) Notice: Subject to any disclaimer, the term of this patent is extended or adjusted under 35 U.S.C. 154(b) by 0 days.

(21) Appl. No.: 15/877,522

(22) Filed: Jan. 23, 2018

(65) Prior Publication Data

US 2019/0223444 A1     Jul. 25, 2019

(51) Int. Cl.
  *A01N 47/44*    (2006.01)
  *A01N 25/04*    (2006.01)
  *A01N 43/88*    (2006.01)

(52) U.S. Cl.
  CPC ............. *A01N 47/44* (2013.01); *A01N 25/04* (2013.01); *A01N 43/88* (2013.01); *A01N 2300/00* (2013.01)

(58) Field of Classification Search
  CPC ................................ A01N 47/44; A01N 25/04
  USPC ........................................................ 514/634
  See application file for complete search history.

(56) References Cited

U.S. PATENT DOCUMENTS

| | | | |
|---|---|---|---|
| 2,867,562 A | 1/1959 | Lamb | |
| 4,183,958 A | 1/1980 | Brown et al. | |
| 4,251,545 A | 2/1981 | Resnick | |
| 2005/0191279 A1 | 9/2005 | Selvig et al. | |
| 2010/0311590 A1 | 12/2010 | Rosati et al. | |
| 2012/0322881 A1 | 12/2012 | Kiguchi et al. | |
| 2014/0193503 A1* | 7/2014 | Pirotte | A01N 47/44 424/489 |
| 2017/0156326 A1 | 6/2017 | Swart et al. | |

FOREIGN PATENT DOCUMENTS

| | | |
|---|---|---|
| CN | 103039495 A | 4/2013 |
| EP | 0026392 A1 | 4/1981 |
| EP | 0155509 A1 | 9/1985 |
| WO | 2008029810 A1 | 3/2008 |

(Continued)

OTHER PUBLICATIONS

Webpage printout of https://www.daf.qld.gov.au/business-priorities/agriculture/plants/fruit-vegetable/fruit-vegetable-crops/mangoes/management-of-post-harvest-mango-diseases, updated Apr. 22, 2014, pp. 1-3. (Year: 2014).*

(Continued)

*Primary Examiner* — Craig D Ricci
*Assistant Examiner* — Janet L Coppins
(74) *Attorney, Agent, or Firm* — Cantor Colburn LLP

(57) ABSTRACT

A method of controlling anthracnose caused by *Colletotrichum* on tropical fruits, tropical fruit plants or cultivars or plant parts or locus thereof is described. The method comprises the steps of contacting the tropical fruit plant or cultivar in need of treatment with an agrochemical composition comprising an effective amount of a guanidine or a salt and/or solvate thereof. The contacting step may be repeated one or more times at a fixed interval. The guanidine may be dodine, iminoctadine trialbesilate, iminoctadine triacetate, guazatine, salts and/or solvates of any of the foregoing and combinations of one or more of the foregoing.

9 Claims, 13 Drawing Sheets

(56) References Cited

FOREIGN PATENT DOCUMENTS

| WO | 2010072634 A2 | 7/2010 | | |
|---|---|---|---|---|
| WO | WO-2010108973 A2 * | 9/2010 | ............ | A01N 43/54 |
| WO | 2013026470 A1 | 2/2013 | | |
| WO | 2017036484 A1 | 3/2017 | | |
| WO | 2017050428 A1 | 3/2017 | | |

OTHER PUBLICATIONS

BBCH Monograh, edited by Uwe Meier (2nd Edition, 2001), Federal Biological Research Centre for Agriculture and Forestry, pp. 1-158. (Year: 2001).*
Freeman et al, Plant Disease (1998), vol. 82 (No. 6), pp. 596-605. (Year: 1998).*
Smith et al, International Journal of Fruit Science (2013), vol. 13, pp. 205-216. (Year: 2013).*
Anonymous; "Peach Anthracnose in Home Fruit Plantings"; available online at https://extension.psu.edu/peach-anthracnose-in-home-fruit-plantings [retrieved on Jul. 30, 2021]; 2020; 2 pages.
Anonymous; "Tropical fruits, list of tropical fruits, uses of tropical fruits, tropical fruits online"; available online at nttps://web.archive.org/web/201 71215052438/https:www.fruitsinfo.com/tropical-fruits.php [retrieved on Jul. 30, 2021 ]; 2006; 6 pages.
European Search Report for Application No. 19743886.4 [PCT/US2019/014525] dated Aug. 9, 2021; 11 pages.

* cited by examiner

METHOD OF CONTROLLING ANTHRACNOSE ON TROPICAL FRUIT PLANTS

FIELD OF THE INVENTION

The present invention relates generally to the control of anthracnose caused by *Colletotrichum* on tropical fruit, tropical fruit plants and cultivars.

BACKGROUND OF THE INVENTION

There are a number of fungal pathogens that collectively cause what growers refer to as anthracnose diseases. Some of the most common pathogens include *Colletotrichum, Phoma,* and *Phyllosticta*. Additional pathogens that cause anthracnose diseases include, but are not limited to, *Coniothyrium, Cryptocline, Diplodia, Gloeosporium, Glomerella, Macrophoma,* and *Phyllostictina*.

Numerous perennials, tropical foliage plants, and woody ornamentals can be afflicted by anthracnose diseases. Some of the most common plants affected by these diseases include Anthurium, Azalea, cacti and succulents, Camellia, Cyclamen, Euonymus, Ficus, Hosta, Hydrangea, Lupine, Mandevilla, Nandina, palms, Spathiphyllum, and Vinca minor to name a few. Anthracnose can be problematic for growers because the presence of leaf spots may greatly reduce the appearance and marketability of crops and plant and harvest losses can occur with more severe symptoms expressed by some of these pathogens. This in turn can raise the costs of cultivation by the demand for control of the diseases and can cause large losses in the shipments destined for market.

The fungus *Colletotrichum gloesporiodes* is the anamorph stage. *Colletotrichum gloesporiodes* is responsible for many diseases on many tropical fruit plants and cultivars including banana, avocado, papaya, coffee, passion fruit, apples, strawberries, peppers, and others, and as both pre-harvest and post-harvest. Post-harvest losses are one of the main factors that limit the export of fruits due to the deterioration in quality.

Mango is in the plant family Anacardiaceae. Related plants in this family include cashew (*Anacardium occidentale*), pistachio (*Pistacia vera*), and poison ivy (*Toxicodendron radicans*). Hundreds of mango cultivars are known worldwide and vary considerably in fruit size, color, shape, flavor, texture and taste. The anthracnose strains from mango comprise a genetically and pathologically distinct population of this species. The mango population of the pathogen always predominates on mango. It is not found on other tropical fruit crops, and has a restricted host range insofar as individuals from the population are highly virulent only on mango. Thus, populations of the pathogen can be host-specific.

Another fungal species that can cause anthracnose is *Colletotrichum acutatum*, which causes avocado anthracnose, as well as citrus, mango and papaya anthracnose.

Anthracnose symptoms take on numerous appearances and vary with the fungal pathogen causing the infection and by the plant species being attacked. The primary symptoms observed are leaf spots and blights, but they are also commonly observed as dieback, cutting rot, and stem rot. These diseases can sometimes be difficult to diagnose. For example, in many instances they appear in propagation as leaf spots or cutting rot diseases. However, they can also carry through and cause symptoms and crop losses later in the production cycle. In some instances, symptoms may not arise until two or three years after the plants were propagated.

On mango plants, anthracnose symptoms occur on leaves, twigs, petioles, flower clusters (panicles) and fruits. On leaves, lesions start as small, angular, brown to black spots that can enlarge to form extensive dead areas. The first symptoms on panicles are small black or dark brown spots, which can enlarge, coalesce and kill the flowers before fruits are produced, greatly reducing yield. Petioles, twigs and stems are also susceptible and develop the typical black expanding lesions found on fruits, leaves, and flowers.

Ripe mangoes affected by anthracnose develop sunken, predominant, dark brown to black decay spots before or after picking. Fruits may drop from trees prematurely. The fruit spots may also coalesce and penetrate deep into the fruit, resulting in extensive fruit rotting. Many green fruit infections remain latent and largely invisible until ripening. Thus, mangoes may appear healthy at harvest and then rapidly develop significant anthracnose symptoms upon ripening. Another symptom type on fruit comprises a "tear stain" symptom, which is a linear necrotic region on the fruit that may or may not be associated with superficial cracking of the epidermis, lending an "alligator skin" effect, and which may also cause mangoes to develop wide, deep cracks in the epidermis that extend into the pulp.

On papaya plants, anthracnose can infect papaya leaves, but the fruit is more severely affected. The first symptoms are small, light colored spots which, as they enlarge, become sunken and take on a water-soaked appearance. As the papaya continues to ripen and as disease progresses, salmon-colored cordially masses of *C. gloesporiodes* typically form concentric ring patterns in the sunken lesions. Another common symptom is "chocolate spot lesions" which consist of sharply-defined reddish-brown irregular or circular sots which quickly enlarge as the fruit ripens, forming large circular, sunken lesions.

In the case of avocado plants, anthracnose is the one of the most severe post-harvest diseases and commonly occurs in areas with high rainfall. In some avocado cultivars, the disease can cause severe problems through the fruiting season. The pathogen may also infect leaves and stems of avocado and can colonize dead avocado plant parts lying on the ground. The site of avocado infection is primarily the fruits, but unlike the form of anthracnose that infects mango, *C. gloeosporioides* does not attack avocado flowers. Lesions of various sizes can occur anywhere on avocado fruits. These lesions are typically dark in color and expand rapidly in size, affecting both skin and pulp. Symptoms may appear rapidly or fruits that appeared to have no blemishes at the time of harvest. in some cases, symptoms may form on the unripe fruits while they are still on the trees and fruits developing symptoms before ripening may drop prematurely.

One of the most extensive damages caused by anthracnose is in the fruit in the garden, transportation, warehouse or market. The fungus invades the fruits during the period of development in the field, and remains latent while the fruit has a hard consistency. Once the fruit starts ripening and softening, the fungus invades its peel and pulp, causing their rot. During transport or storage, dark spots can develop that merge to cover extensive areas of the fruit.

Wet, humid and warm weather conditions favor anthracnose infections in the field, and warm, humid temperatures favor post-harvest anthracnose development on mango plants. Lesions on stems and fruits may produce conspicuous pinkish-orange spore masses under wet conditions. In the case of papaya plants, spread of the pathogen around plants and fruits and infection in papaya depend heavily on moisture provided by rainfall. Thus, anthracnose reaches highest disease incidence and severity in those areas where relative humidity and rainfall are higher and the air temperature is warm and conducive for fungal development.

Anthracnose diseases are most prevalent under moist growing conditions, particularly following exposure to rainfall or where overhead irrigation is used. They spread from plant to plant with splashing water. The occurrence of anthracnose can often be traced back to infected starting materials. Wounding can also contribute to disease severity, but is not necessary for infections to occur.

Management of anthracnose includes site selection, cultivar selection, cultural practices in the field (i.e., sanitation, plant spacing, intercropping, etc.), moisture management, fungicides, harvest management, and post-harvest treatments.

Control of anthracnose of susceptible plants and cultivars and in conducive environments frequently requires periodic fungicide sprays and the timing and frequency of application is critical for adequate disease control. Many fungicide applications work best when they are applied preventatively or just as infections are beginning to occur.

Table 1 lists a variety of fungicides that have been used to control anthracnose on mango, papaya and avocado plants and cultivars.

TABLE 1

Fungicides for Controlling Anthracnose on Tropical Fruit Plants

| | Mango | Papaya | Avocado |
|---|---|---|---|
| Neem oil | X | | X |
| Mono- and di-potassium salts of phosphorous acid | X | | X |
| Basic cupric sulfate | X | X | |
| Copper hydroxide | X | X | X |
| Mancozeb | X | | |
| Chlorothalonil | X | X | |
| Harpin protein | X | | |
| Copper salts of fatty and rosin acids | X | | X |
| Azoxystrobin | | X | |
| *Bacillus pumilis* strain QST | X | | X |
| *Bacillus subtilis* QST713 | | X | X |
| Copper hydroxide + mancozeb | | X | |
| Copper sulfate pentahydrate | | X | |
| Cuprous oxide | | X | |
| Cuprous oxychloride + copper hydroxide | | X | |
| Mancozeb + Phosphorus acid | | X | |
| *Reynoutria sachalinensis* | | X | |
| Carbonic acid, monopotassium salt | | | X |
| Fosetyl-Al | | | X |
| Metalaxyl | | | X |

However, it is also desirable to investigate additional fungicides that can be used to control anthracnose on a variety of vulnerable populations of tropical fruit plants and cultivars.

SUMMARY OF THE INVENTION

It is an object of the present invention to provide a fungicide composition that is capable of controlling anthracnose on tropical fruit plants and cultivars.

It is another object of the present invention to provide a fungicide composition that is capable of controlling anthracnose on mangoes, papayas and avocados.

It is another object of the present invention to provide an improved method of controlling anthracnose on tropical fruit plants and cultivars using guanidines.

It is another object of the present invention to provide an improved method of foliar control of anthracnose on susceptible tropical fruit plants and cultivars using guanidines.

It is still another object of the present invention to provide a method of post-harvest treatment of tropical fruits to control anthracnose on the fruits.

To that end, in one embodiment the present invention relates generally to a method of controlling anthracnose caused by *Colletotrichum* on a tropical fruit plant or cultivar, the method comprising:

contacting the tropical fruit plant or cultivar in need of treatment with an agrochemical composition comprising an effective amount of a guanidine or a salt and/or solvate thereof.

In another embodiment, the present invention relates generally to a method of treating a tropical fruit plant or cultivar susceptible to anthracnose, the method comprising the steps of:

contacting the tropical fruit plant or cultivar with an agrochemical composition comprising an effective amount of a guanidine or a salt and/or solvate thereof; and repeating the contacting step one or more times at a fixed interval.

BRIEF DESCRIPTION OF THE DRAWINGS

For a fuller understanding of the invention, reference is made to the following description taken in connection with the accompanying figures, in which.

DETAILED DESCRIPTION OF THE PREFERRED EMBODIMENTS

Figure 1:
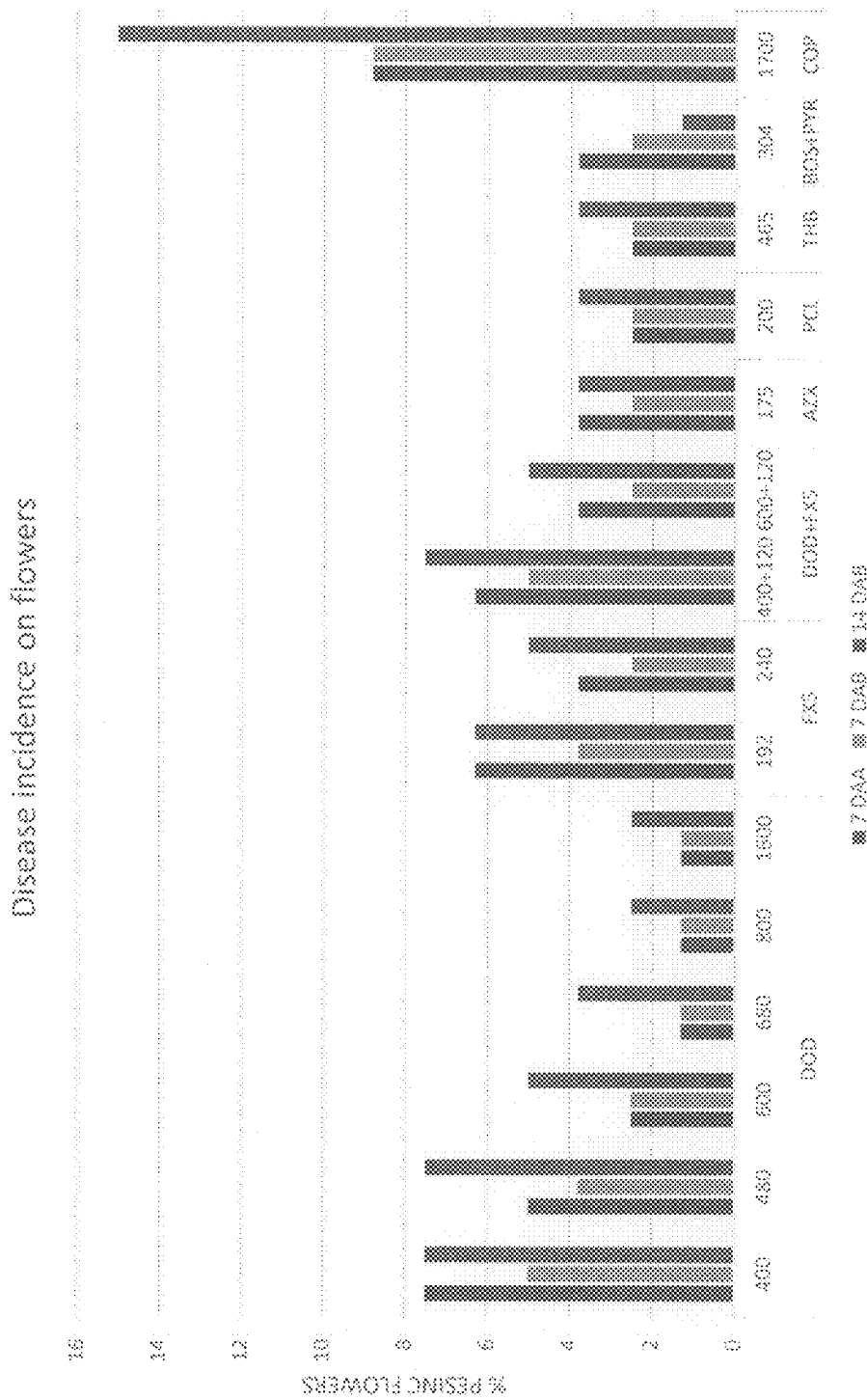
FIG. 1 depicts papaya disease incident results on flowers at a first location.

Unless otherwise defined, all terms set forth herein, including technical and scientific terms, have the meaning as commonly understood by one skilled in the art to which this invention belongs.

"A," "an," and "the" as used herein refer to both singular and plural referents unless the context clearly dictates otherwise.

As used herein, the term "about" refers to a measurable value such as a parameter, an amount, a temporal duration, and the like and is meant to include variations of +1-15% or less, preferably variations of +1-10% or less, more preferably variations of +/−5% or less, even more preferably variations of +/−1% or less, and still more preferably variations of +1-0.1% or less of and from the particularly recited value, in so far as such variations are appropriate to perform in the invention described herein. Furthermore, it is also to be understood that the value to which the modifier "about" refers is itself specifically disclosed herein.

As used herein, the term "immediately," including "immediately before" or "immediately after" refers to a time period that is within one day, more preferably within several hours, more preferably within one hour, and still more preferably within several minutes.

As used herein the term "to control" or "controlling" is used to mean that the composition, when applied to a plant tissue or a growing plant which is affected with *Colletotrichum*, is able to limit the growth, colonization or proliferation of anthracnose on tropical fruit plants and cultivars, including papaya, mango and avocado plants and cultivars. In some embodiments, the composition is able to kill the *Colletotrichum*, thereby avoiding their colonization and/or proliferation on the plant tissue. Thus, the composition is able to control, i.e., limit or stop the spread of anthracnose, which is caused by the *Colletotrichum*. The composition also allows for the treatment of anthracnose at a lotus.

As used herein, the term "effective amount" refers to the least amount of the active ingredient that is required to control anthracnose on the plant, plant part or locus thereof. Dodecylguanidine acetate, also known as dodine, is a guanidine fungicide that has been recommended for the control of a variety of major fungal diseases of crops including, for example, almond scab and shot hole, apple and pear scab, banana sigatoka, cherry leaf spot, olive peacock spot, peach leaf curl, peanut early and late leaf spot and pecan scab.

Other guanidine fungicidal compounds include iminoctadine trialbesilate, iminoctadine triacetate, and guazatine.

The inventors of the present invention have determined that guanidine fungicides such as dodine can be used to control anthracnose on tropical fruit plants and cultivars, including mango, papaya and avocado plants and cultivars as further described herein.

In one embodiment, the present invention relates generally to a method of protecting tropical fruit plants and cultivars against damage caused by anthracnose, the method comprising the steps of treating a plant, plant part, or a locus thereof, with an agrochemical composition comprising an effective amount of guanidine or a salt and/or a solvate thereof.

The guanidine can be formulated as a wettable powder, a suspension concentrate, and as a wettable granule. In one embodiment, the guanidine is dodine, which is a slightly yellow, fine powder with low solubility in water (0.63 g/L at 25° C.) and organic solvents.

Various forms of dodine may be used in the agrochemical composition described herein, including salts and/or solvates of dodine. For example, one form of dodine is available under the tradename Syllit® and has been used as a foliar fungicide and bactericide. In one embodiment, the dodine used in the agrochemical composition is an acetate form of dodine, such as 1-dodecylguanidinium acetate (dodecylguanidine monoacetate), which has a molecular formula $C_{15}H_{33}N_3O_2$. Other forms of dodine, such as dodine HCl 35% are also usable in compositions of the present invention. In addition, and as described herein, other guanidine fungicides, including iminoctadine trialbesilate, iminoctadine triacetate, and guazatine, may also be used in the practice of the invention described herein for controlling anthracnose on tropical fruits such as papayas, mangoes, and avocados.

The agrochemical compositions of the present invention may further contain one or more agriculturally acceptable auxiliaries. The auxiliaries employed in the agrochemical composition and their amounts will depend in part upon the type of formulation or composition and/or the manner in which the formulation is to be applied. Suitable auxiliaries include, but are not limited to formulation adjuvant or components, such as solvents, surfactants, stabilizers, anti-foaming agents, anti-freezing agents, preservatives, antioxidants, colorants, thickeners and inert fillers and these auxiliaries may be used individually in the agrochemical composition or as a combination of one or more auxiliaries.

For example, the composition may comprise one or more solvents, which may be organic or inorganic. Suitable solvents are those that thoroughly dissolve the agrochemically active substances employed. Examples of suitable solvents include water, aromatic solvents, such as xylene (for example solvent products commercially available from Solvesso™), mineral oils, animal oils, vegetable oils, alcohols, for example methanol, butanol, pentanol, and benzyl alcohol; ketones, for example cyclohexanone, and gamma-butyrolactone, pyrrolidones, such as NMP, and NOP, acetates, such as glycol diacetate, glycols, fatty acid dimethylamides, fatty acids, and fatty acid esters.

The composition may optionally include one or more surfactants. Suitable surfactants are generally known in the art and include, but are not limited to, alkali metal, alkaline earth metal and ammonium salts of lignosulfonic acid, naphthalenesulfonic acid, phenolsulfonic acid, dibutylnaphthalenesulfonic acid, alkylarylsulfonates, alkyl sulfates, alkylsulfonates, arylsulfonates, fatty alcohol sulfates, fatty acids and sulfated fatty alcohol glycol ethers, furthermore condensates of sulfonated naphthalene and naphthalene derivatives with formaldehyde, condensates of naphthalene or of naphthalenesulfonic acid with phenol, octylphenol, nonylphenol, alkylphenyl polyglycol ethers, tributylphenyl polyglycol ether, tristearylphenyl polyglycol ether, alkylaryl polyether alcohols, alcohol and fatty alcohol/ethylene oxide condensates, ethoxylated castor oil, polyoxyethylene alkyl ethers, ethoxylated polyoxypropylene, lauryl alcohol polyglycol ether acetal, sorbitol esters, lignin-sulfite waste liquors and methylcellulose and ethylene oxide/propylene oxide block copolymers.

The composition may optionally comprise one or more polymeric stabilizers. Suitable polymeric stabilizers that may be used in the present invention include, but are not limited to, polypropylene, polyisobutylene, polyisoprene, copolymers of monoolefins and diolefins, polyacrylates, polystyrene, polyvinyl acetate, polyurethanes or polyamides.

The composition may include an anti-foaming agent. Suitable anti-foam agents include, for example, mixtures of polydimethylsiloxanes and perfluroalkylphosphonic acids, such as the silicone anti-foam agents.

One or more preservatives may also be present in the composition. Suitable examples include, for example, Preventol® (commercially available from Bayer AG) and Proxel® (commercially available from Bayer AG).

Furthermore, the composition may also include one or more antioxidants, such as butylated hydroxytoluene.

The compositions may further comprise one or more solid adherents. Such adherents are known in the art and available commercially. They include organic adhesives, including tackifiers, such as celluloses of substituted celluloses, natural and synthetic polymers in the form of powders, granules, or lattices, and inorganic adhesives such as gypsum, silica, or cement.

The compositions may include one or more inert fillers, including, for example, natural ground minerals, such as kaolins, aluminas, talc, chalk, quartz, attapulgite, montmorillonite, and diatomaceous earth, or synthetic ground minerals, such as highly dispersed silicic acid, aluminum oxide, silicates, and calcium phosphates and calcium hydrogen phosphates. Suitable inert fillers for granules include, for example, crushed and fractionated natural minerals, such as calcite, marble, pumice, sepiolite, and dolomite, or synthetic granules of inorganic and organic ground materials, as well as granules of organic material, such as sawdust, coconut husks, corn cobs, and tobacco stalks.

The compositions may also include one or more thickeners, including, for example, gums, such as xanthan gum, PVOH, cellulose and its derivatives, clay hydrated silicates, magnesium aluminum silicates or a mixture thereof.

In some embodiments of the present invention, the agrochemical composition may be applied and used in pure form, or more preferably together with at least one of the auxiliaries, as described above.

The composition of the present invention may also comprise other active ingredients for achieving specific effects, for example, bactericides, fungicides, insecticides, nematicides, molluscicides or herbicides.

In one embodiment the dodine or other guanidine may be combined with one or more additional fungicides. These one or more additional fungicides include, but are not limited to neem oil, mono- and di-potassium salts of phosphorous acid, basic copper sulfate, copper sulfate pentahydrate, copper hydroxide, mancozeb, chlorothalonil, harpin protein, copper salts of fatty and rosin acids, strobilurins such as azoxystrobin and fluoxastrobin, *Bacillus pumilis* strain QST, *Bacillus subtilis* QST713, cuprous oxide, *Reynoutria sachalinensis*, a monopotassium salt of carbonic acid, Fosetyl-Al, metalaxyl, and combinations of the foregoing. Other fungicides that can be demonstrated to be effective against anthracnose on tropical fruit plants and cultivars may also be usable in compositions of the instant invention, alone or in combination with one or more of the listed compounds.

Suitable bactericides, insecticides, nematicides, molluscicides or herbicides compounds that are compatible with dodine and other guanidines would also be usable in the compositions described herein and would be known to those skilled in the art.

The agrochemical composition of the present invention may be formulated in different ways, depending upon the circumstances of its use. Suitable formulation techniques are known in the art and include water-dispersible powders, dusts, pastes, water-dispersible granules, solutions, emulsifiable concentrates, emulsions, suspension concentrates, aerosols, or microencapsulation suspensions.

In one embodiment, the present invention relates generally to a method of controlling anthracnose caused by *Colletotrichum*, the method comprising:

contacting a tropical fruit plant or cultivar in need of treatment with an agrochemical composition comprising an effective amount of a guanidine or a salt and/or solvate thereof.

In one embodiment, the method comprises the step of applying a first fungicide spray to the tropical fruit plant or cultivar prior to flowering of the tropical fruit plant or cultivator and then applying the effective amount of the guanidine or salt or solvate thereof as a foliar spray at the start of flowering of the tropical fruit plant or cultivar under climatic conditions favorable to the disease. If used, the first fungicide spray comprises a copper oxychloride spray applied prior to flowering.

In another preferred embodiment, the present invention relates generally to a method of treating a tropical fruit plant or cultivar susceptible to anthracnose, the method comprising the steps of:

contacting the tropical fruit plant or cultivar with an agrochemical composition comprising an effective amount of a guanidine or a salt and/or solvate thereof; and repeating the contacting step one or more times at a fixed interval.

In another preferred embodiment, the present invention relates generally to a method of treating tropical fruits post-harvest, the method comprising the steps of:

a) harvesting tropical fruits from plants or cultivators that are susceptible to anthracnose;

b) contacting the harvested tropical fruits with an agrochemical composition comprising an effective amount of a guanidine or a salt and/or solvate thereof; and c) repeating the contacting step one or more times at a fixed interval.

It is also contemplated that any combination of the above may be undertaken. For example, depending on the extent of anthracnose infection or potential extent of anthracnose infection (i.e., depending on weather conditions), it may be beneficial to applying the agrochemical composition to the plant or cultivar at the start of flowering and then at prescribed intervals during the growing season and to then also treat the fruits post-harvest to minimize loss. Other scenarios of contacting steps would also be known to those skilled in the art and could be used again depending on the level or expected level of infection in susceptible tropical plants or cultivars.

Examples of formulation types for use in the present invention include the following:

A) Water-soluble concentrates, in which a guanidine or a salt and/or solvate thereof is dissolved in a water-soluble solvent. One or more wetting agents and/or other auxiliaries may be included. The active compound dissolves upon dilution with water.

B) Emulsifiable concentrates, in which a guanidine or a salt and/or solvate thereof is dissolved in a water-immiscible solvent, preferably with the addition of one or more non-anionic emulsifiers and anionic emulsifiers. The mixture is agitated, for example by stirring, to get a uniform formulation. Dilution with water provides a stable emulsion.

C) Emulsions, in which a guanidine or a salt and/or solvate thereof is dissolved in one or more suitable water immiscible solvents, preferably with the addition of one or more non-anionic emulsifiers and anionic emulsifiers. The resulting mixture is introduced into water by appropriate means, such as an emulsifying machine, to provide a homogeneous emulsion. Dilution with water gives a stable emulsion.

D) Suspensions, in which a guanidine or a salt and/or solvate thereof is comminuted in an agitated ball mill, preferably with the addition of one or more dispersants and wetting agents, and water or solvent to give a fine active compound suspension. Dilution with water gives a stable suspension of the active compound.

E) Water-dispersible granules and/or water-soluble granules in which a guanidine or a salt and/or solvate thereof is ground finely, preferably with the addition of one or more dispersants and wetting agents, and prepared as water-dispersible or water-soluble granules by means of suitable techniques, for example by extrusion, drying in a spray tower, or by processing in a fluidized bed. Dilution with water gives a stable dispersion or solution of the active compound.

F) Water-dispersible powders and water-soluble powders, in which a guanidine or a salt and/or solvate thereof is ground in a suitable apparatus, such as a rotor-stator mill, preferably with addition of one or more dispersants, wetting agents and silica gel. Dilution with water gives a stable dispersion or solution of the active compound.

G) Granules, in which a guanidine or a salt and/or solvate thereof is finely ground in a suitable apparatus, with addition of up to 99.5 parts by weight of carriers. Granules can then be prepared either by suitable techniques, such as extrusion, spray-drying or using a fluidized bed.

Thus, in the instance of a suspension concentrate, the suspension concentrate may contain between about 100 and about 1,000 g/L of a guanidine or a salt of solvate thereof, and may contain between about 100 and about 300 g/L of or between about 200 g/L to about 300 g/L or between about 300 and about 500 g/L of the guanidine or salt or solvate thereof. In one embodiment, and as described above, the guanidine or salt or solvate thereof may be selected from the group consisting of dodine, iminoctadine trialbesilate, iminoctadine triacetate, guazatine, and combinations of one or more of the foregoing. In one preferred embodiment, the guanidine comprises dodine or a salt or solvate thereof. In another preferred embodiment, the guanidine comprises iminoctadine trialbesiliate or iminoctadine triacetate or a salt or solvate thereof.

In one particularly preferred embodiment, the present invention describes the use of an agrochemical composition or formulation comprising a guanidine or a salt or solvate thereof for the control of anthracnose at a locus. In one embodiment, the locus is soil and the agrochemical formulation is applied to the soil at a suitable interval.

In a still further aspect, the present invention provides a method for controlling anthracnose at a locus, comprising applying to the locus an agrochemical composition or formulation comprising a guanidine or a salt or solvate thereof as described herein.

In use, the composition of the present invention may be applied to the target plant or plant of interest, to one or more parts thereof (such as leaves or seeds or roots), or to the locus thereof. In a particular preferred embodiment, the agrochemical composition is used as a foliar fungicide. The composition and method of the present invention find particular advantageous use in the control of anthracnose caused by *Colletotrichum* in susceptible cultivars. In addition, the present invention also finds particularly advantageous use in preventing anthracnose caused by *Colletotrichum* in susceptible cultivars.

In general, the composition or formulation is prepared and applied such that the agrochemical composition comprising a guanidine or a salt and/or solvate thereof is applied at any suitable rate, as demanded by the locus to be treated. The application rate may vary within wide ranges and depends upon such factors as the soil constitution, the type of application (i.e., foliar application), the plant variety and/or cultivar, the level of infection, the climatic circumstances prevailing in each case, as well as other factors determined by the type of application, timing of application and target crop.

Typically, the application rate may be from about 1 to about 5,000 g (or ml) of the agrochemical composition per hectare, and depending on the various factors described above, may be 10 to 4,000 g/ha, more preferably 150 to 2,000 g/ha, or may be 150 to 300 g/ha or 200 to 300 g/ha or another amount of agrochemical composition that is effective to treat anthracnose. As described herein, the guanidine may be applied alone or in combination with a second fungicide. In one embodiment, the second fungicide is a strobilurin such as fluoxastrobin. Thus, the guanidine or salt or solvate thereof may be prepared as a mixture with the strobilurin. In one preferred embodiment the guanidine is dodine and the strobilurin is fluoxastrobin. In one embodiment, the agrochemical composition be applied at rate of between about 200 g/ha and about 800 g/ha of the guanidine and about 80 g/ha and about 150 g/ha of the strobilurin, more preferably between about 350 g/ha and about 650 g/ha of the guanidine and about 110 g/ha to about 125 g/ha of the strobilurin, or at a rate of between about 400 g/ha and about 600 g/ha of the guanidine and about 115 g/ha and about 125 g/ha of the strobilurin.

According to the present invention, the use of the agrochemical composition or formulation comprising a guanidine or a salt and/or solvate thereof may be applied at any suitable time. In some embodiments, the composition is applied to the soil or the locus of the plant prior to planting, during planting, or after planting. Such a treatment may take place by conventional methods known in the art, including, for example, drip-irrigation, chem-irrigation, and spray. In a preferred embodiment, the preferred treatment is by a foliar spray.

The step of treating the plant, plant part or a locus thereof may also be repeated one or more times at a fixed interval. The fixed interval may be between 1 and 40 days, preferably between 7 and 40 days, more preferably between 7 and 15 days. Thus, the fixed interval may be, for example, 7 days, 10 days, 14 days, 21 days, 30 days, etc. depending on various factors, including the rate of infection in the plants, plant parts or locus thereof, the application method of the agrochemical composition and the strength (i.e., concentration of the guanidine or salt or solvate thereof in the agrochemical composition.

In another embodiment, and as described above, the agrochemical composition is applied to the tropical fruit post-harvest. If treating the fruit post-harvest, the agrochemical composition is first within one or two days of being harvested and may then be re-applied one or more times, depending on the length of time and conditions under which the fruits will be transported and/or stored.

According to the present invention, the use of the agrochemical composition or formulation comprising a guanidine or a salt and/or solvate thereof for treating plants, plant parts, or a locus thereof is through the use of various processing methods carried out directly on the plant or plant parts or to the environment, the habitat or storage space of the plant or plant parts. These methods include, for example, dipping, spraying, atomizing, irrigation, evaporation, powdering, misting, fogging, spreading, foam, coating, painting, spreading-on, watering, soaking, drip irrigation, and chemirrigation.

In one embodiment, the present invention provides an improved method of treating, ameliorating or preventing anthracnose infection in a plant, the method comprising contacting a plant in need of such treatment with agrochemically effective amounts of the agrochemical composition described herein.

The invention will now be described in reference to the following non-limiting examples. Table 2 provides a list of the various fungicides and the dosage rates thereof illustrated in the Examples.

TABLE 2

List of Fungicides Used in Examples

| Abbreviation | Formulation | Dose Rate (g as/ha) |
| --- | --- | --- |
| Untreated Control | | |
| DOD | Dodine 400SC | 400 |
| DOD | Dodine 400SC | 480 |
| DOD | Dodine 400SC | 600 |
| DOD | Dodine 400SC | 680 |
| DOD | Dodine 400SC | 800 |
| DOD | Dodine 400SC | 1600 |
| FXS | Fluoxastrobin 480SC | 192 |
| FXS | Fluoxastrobin 480SC | 240 |
| DOD + FXS | Dodine 400SC + Fluoxastrobin 480SC | 400 + 120 |
| DOD + FXS | Dodine 400SC + Fluoxastrobin 480SC | 600 + 120 |
| AZX | Azoxystrobin 250SC | 175 |
| PCL | Pyraclostrobin 260EC | 200 |
| THB | Thiabendazole 465SC | 465 |
| BOS + PYR | Boscalid 252 + Pyraclostrobin 128 WG | 304 |
| COP | Copper oxychloride 850 WP | 1700 |

Example 1

A trial protocol was conducted on papaya plants using a dodine suspension concentrate (400SC) with a water volume of 578 L/ha. One general copper oxychloride spray (3.5 g/L water) was applied prior to flowering. The trials were conducted at two locations.

The first foliar spray of dodine was applied at the start of flowering under climatic conditions favorable to the disease (i.e., wet, humid and/or warm weather conditions) and the second foliar spray was applied 7 days later.

Assessments were taken at 0 days, 7 days after the first foliar spray, 7 days after the second foliar spray and 14 days after the second foliar spray. The plants were assessed for disease increase/severity on flowers to predict yield loss, disease severity on leaves, disease severity on fruits and phytotoxicity according to the scale provided in Table 3.

TABLE 3

Level of Disease Severity

| Scale | Level of Attack | Spots per Fruit |
| --- | --- | --- |
| 0 | None | Healthy fruit |
| 1 | Traces | Chlorotic or dark spots, <1 mm |
| 2 | Low | Dark spots, 1-5 mm |
| 3 | Medium | Dark spots, >6 mm |
| 4 | Severe | Dark, sunken spots with presence of conidia |

Figure 2:
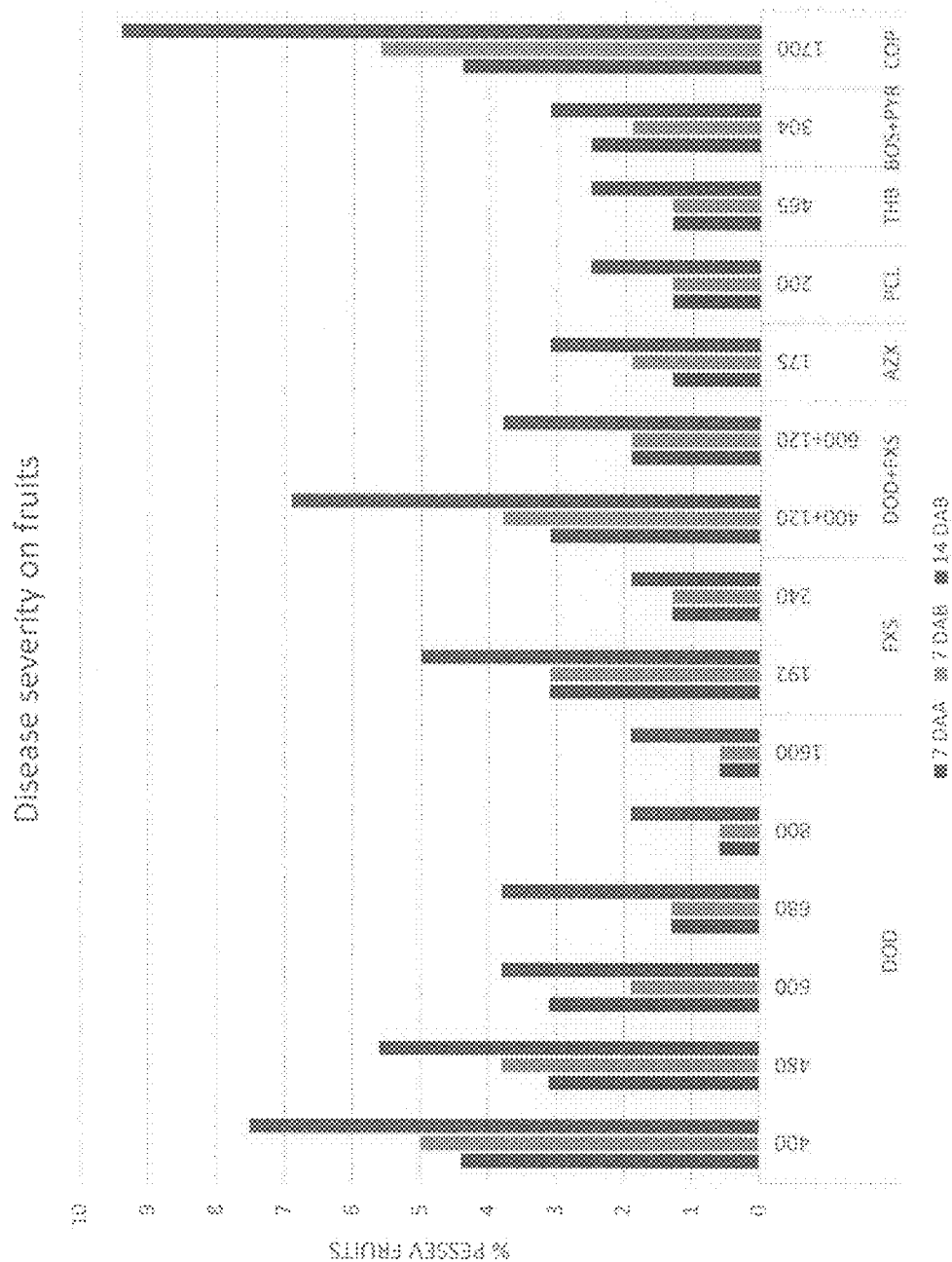
FIG. 2 depicts papaya disease incident results on fruits at a first location.
Figure 3:
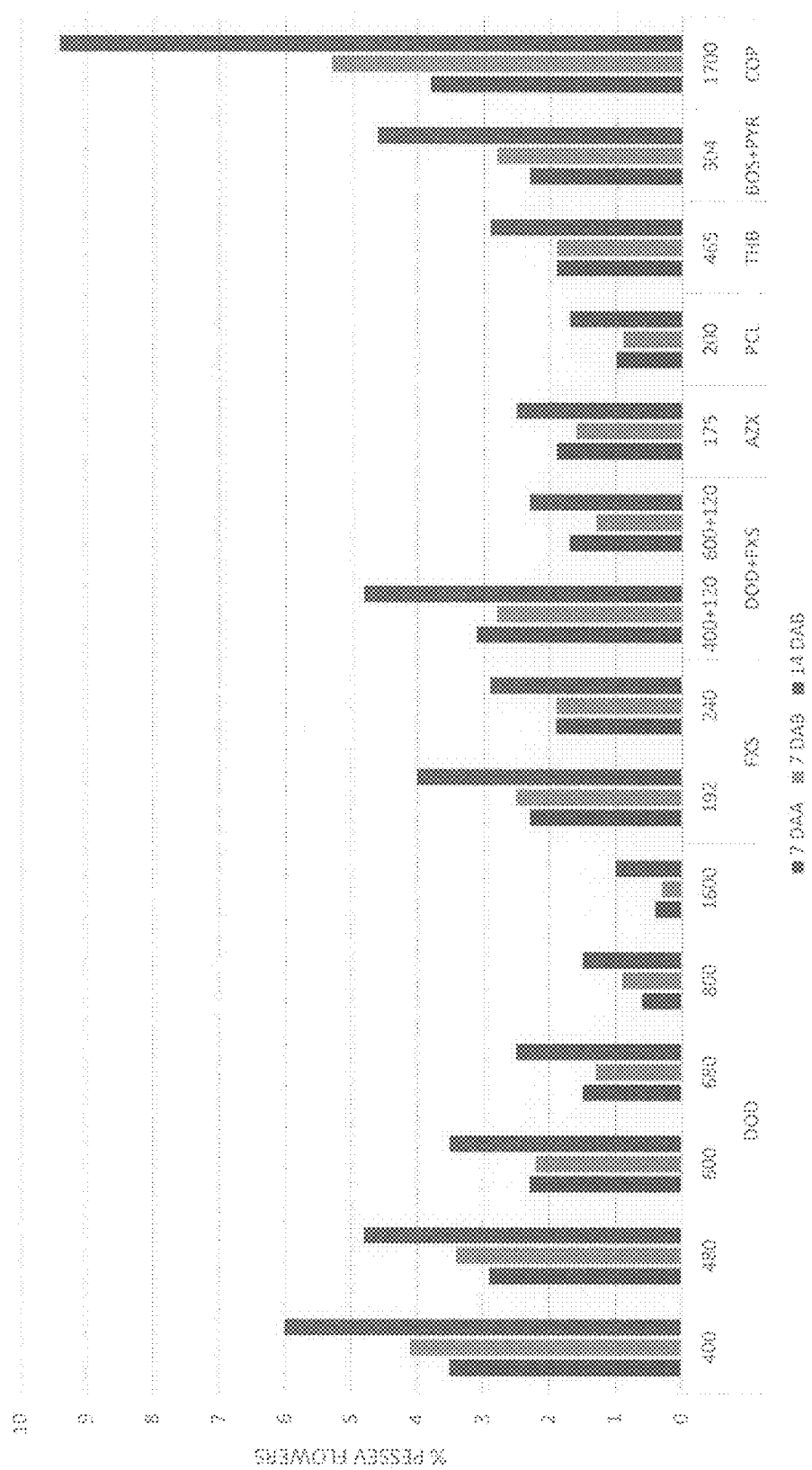
FIG. 3 depicts papaya disease incident results on flowers at a second location.
Figure 4:
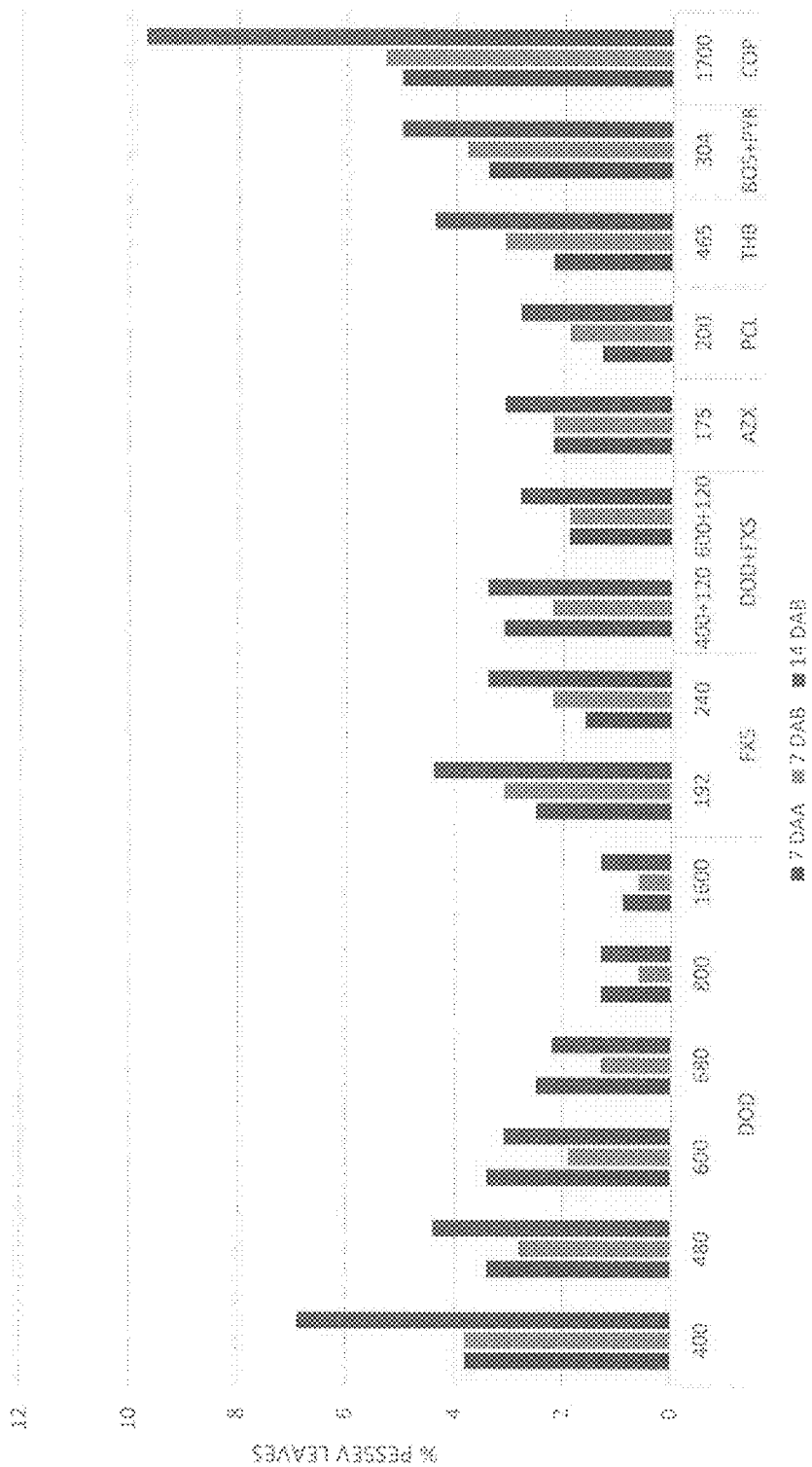
FIG. 4 depicts papaya disease incident results on leaves at a second location.
Figure 5:
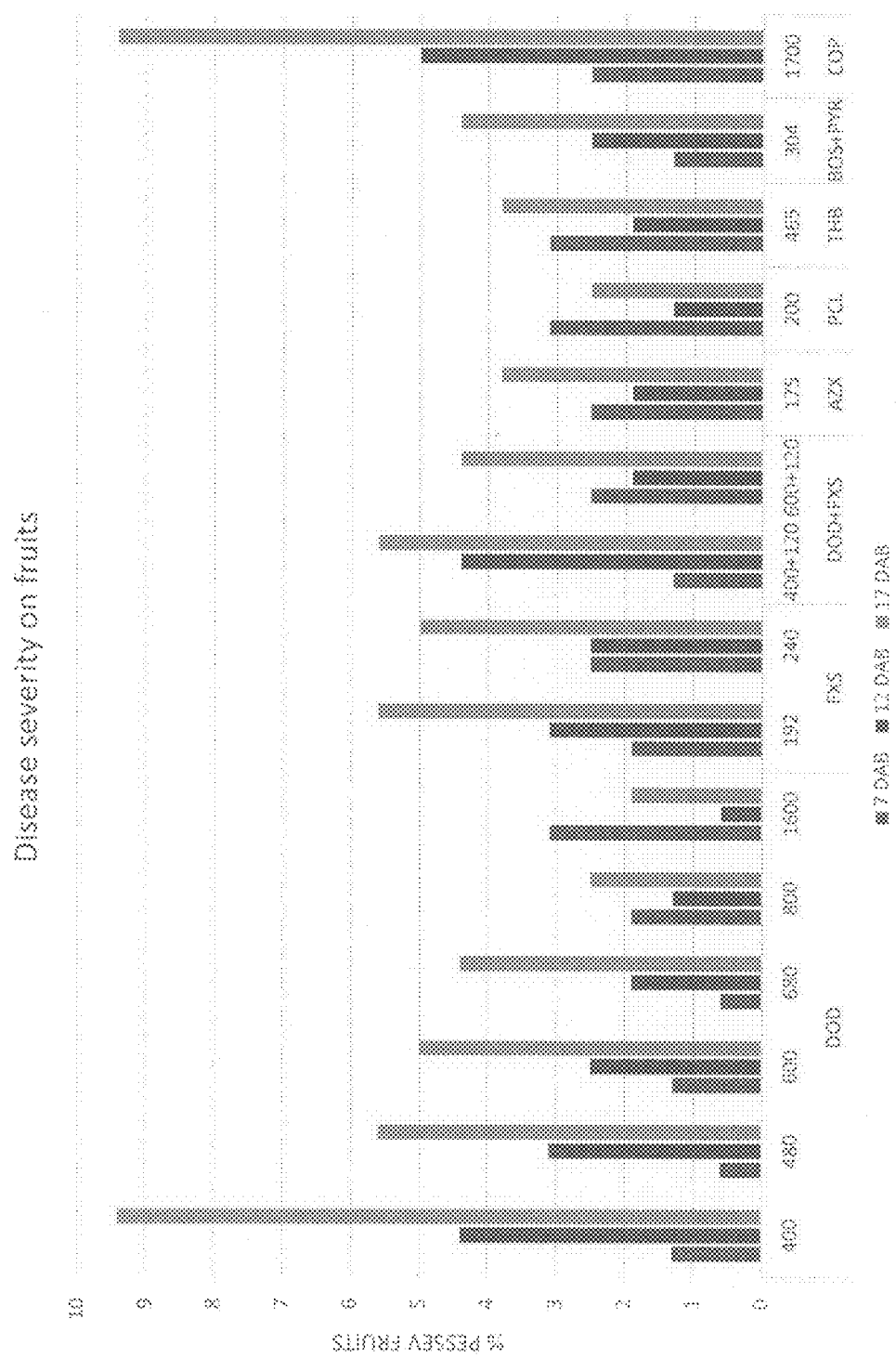
FIG. 5 depicts papaya disease incident results on fruits at a second location.

The disease incident results on flowers at the first location are shown in FIG. 1, and the disease incident results on fruits at the first location are shown in FIG. 2 for each application of fungicide. FIGS. 3 4, and 5 show the disease incident results on flower, leaves and fruits respectively at the second location for each application of fungicide.

The results are shown at 7 days after the first application, 7 days after the second application and 14 days after the second application. At 0 days, all of the treatments showed similar disease presence and there were no significant differences between the different treatments.

As seen in FIGS. 1-5, various concentrations of dodine had a positive effect on the disease incident results on papaya fruits and flowers at both locations and on the leaves at the second location.

Example 2

A trial protocol was conducted on mango plants using a dodine suspension concentrate (400SC) with a water volume of 1060-1100 L/ha. One general copper oxychloride spray (3 kg/ha water) was applied prior to flowering. The trials were conducted at two locations.

The first foliar spray of dodine was applied at the start of flowering under climatic conditions favorable to the disease (i.e., wet, humid and/or warm weather conditions) and the second foliar spray was applied 7 days later.

Assessments were taken at 0 days, 7 days after the first foliar spray, 7 days after the second foliar spray and 14 days after the second foliar spray. The plants were assessed for disease increase/severity on flowers to predict yield loss, disease severity on leaves, disease severity on fruits and phytotoxicity according to the scale provided in Table 3.

Figure 6:
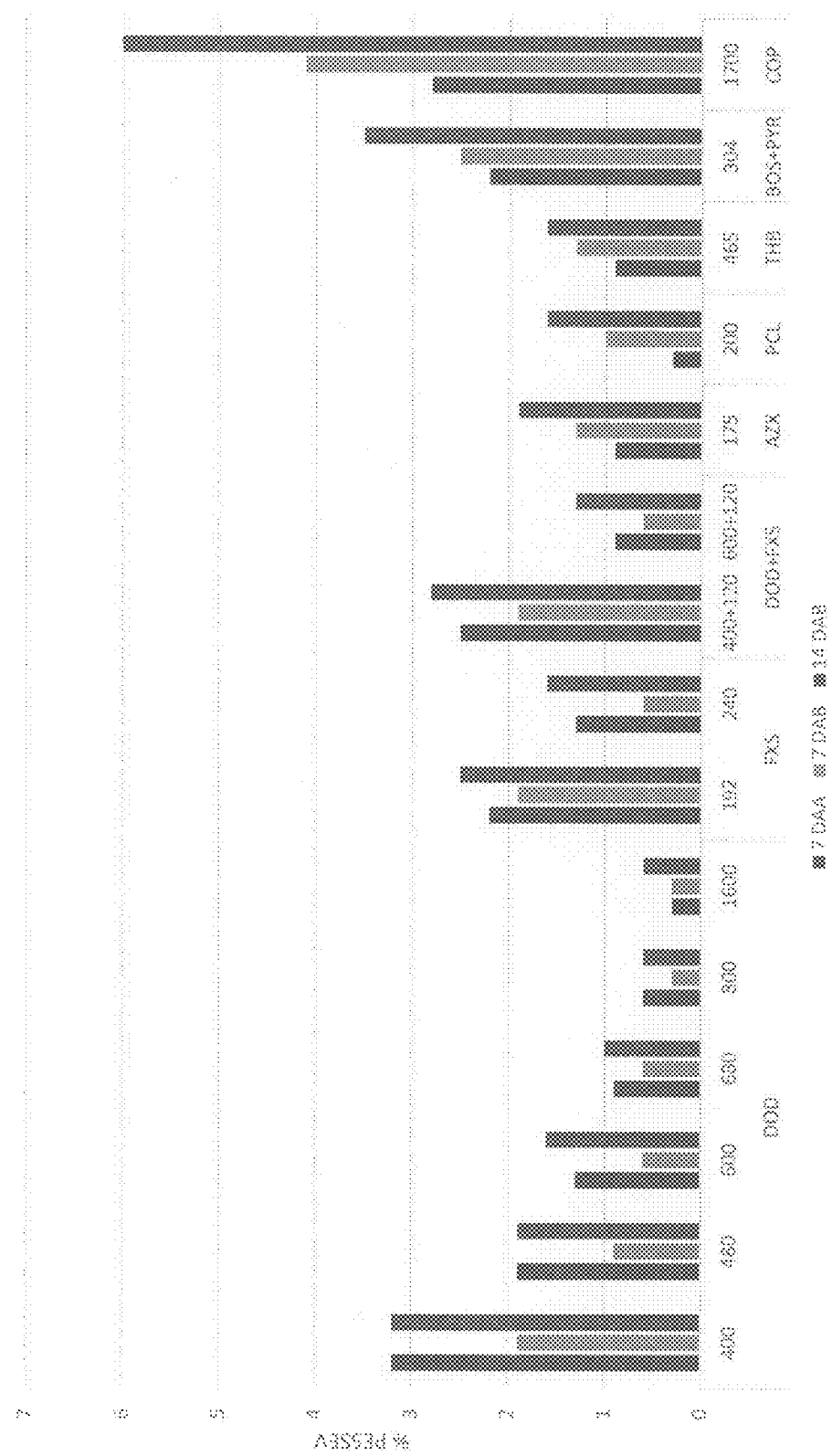
FIG. 6 depicts mango disease incident results on flowers at a first location.
Figure 7:
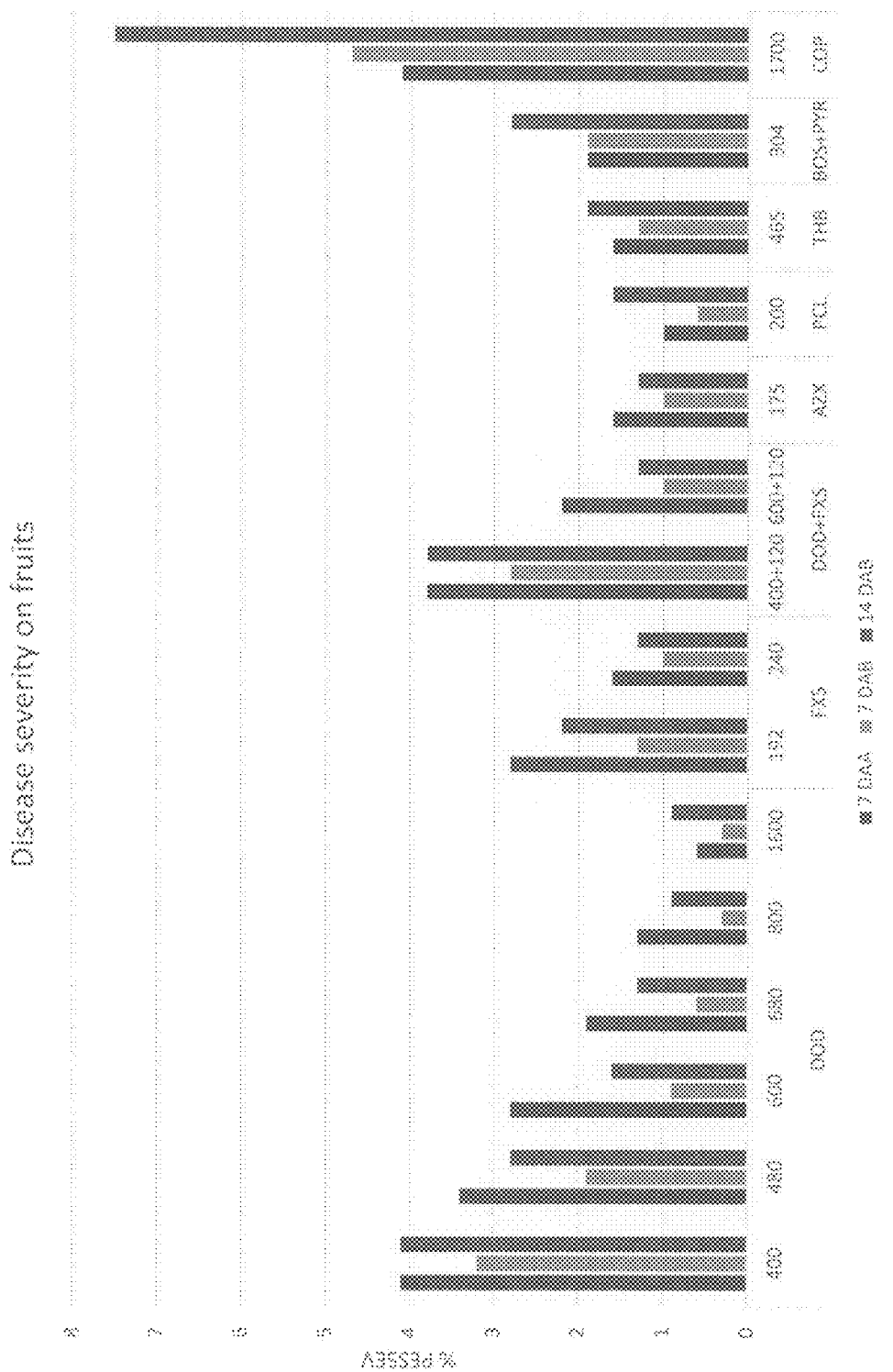
FIG. 7 depicts mango disease incident results on fruits at a first location.
Figure 8:
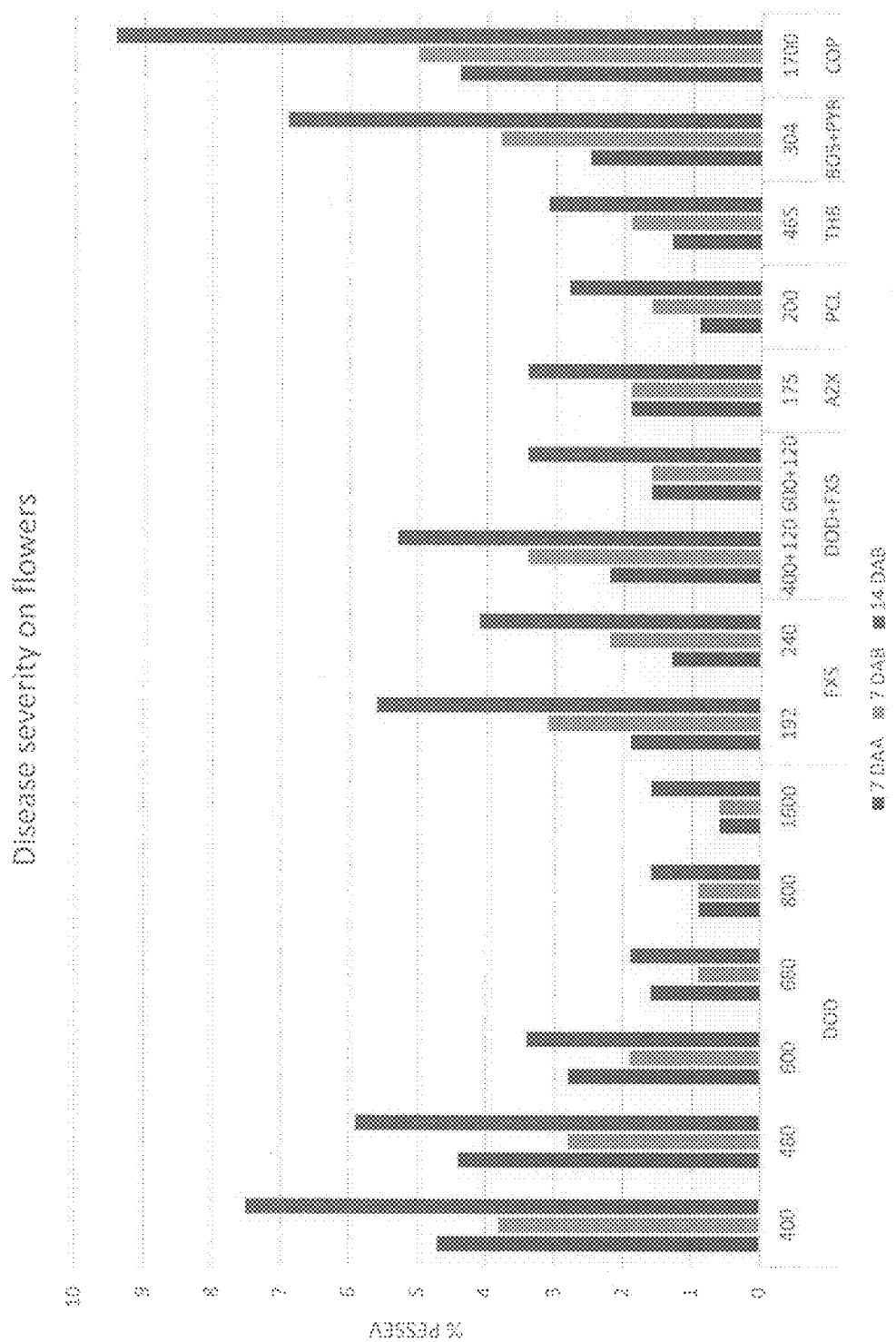
FIG. 8 depicts mango disease incident results on flowers at a second location.
Figure 9:
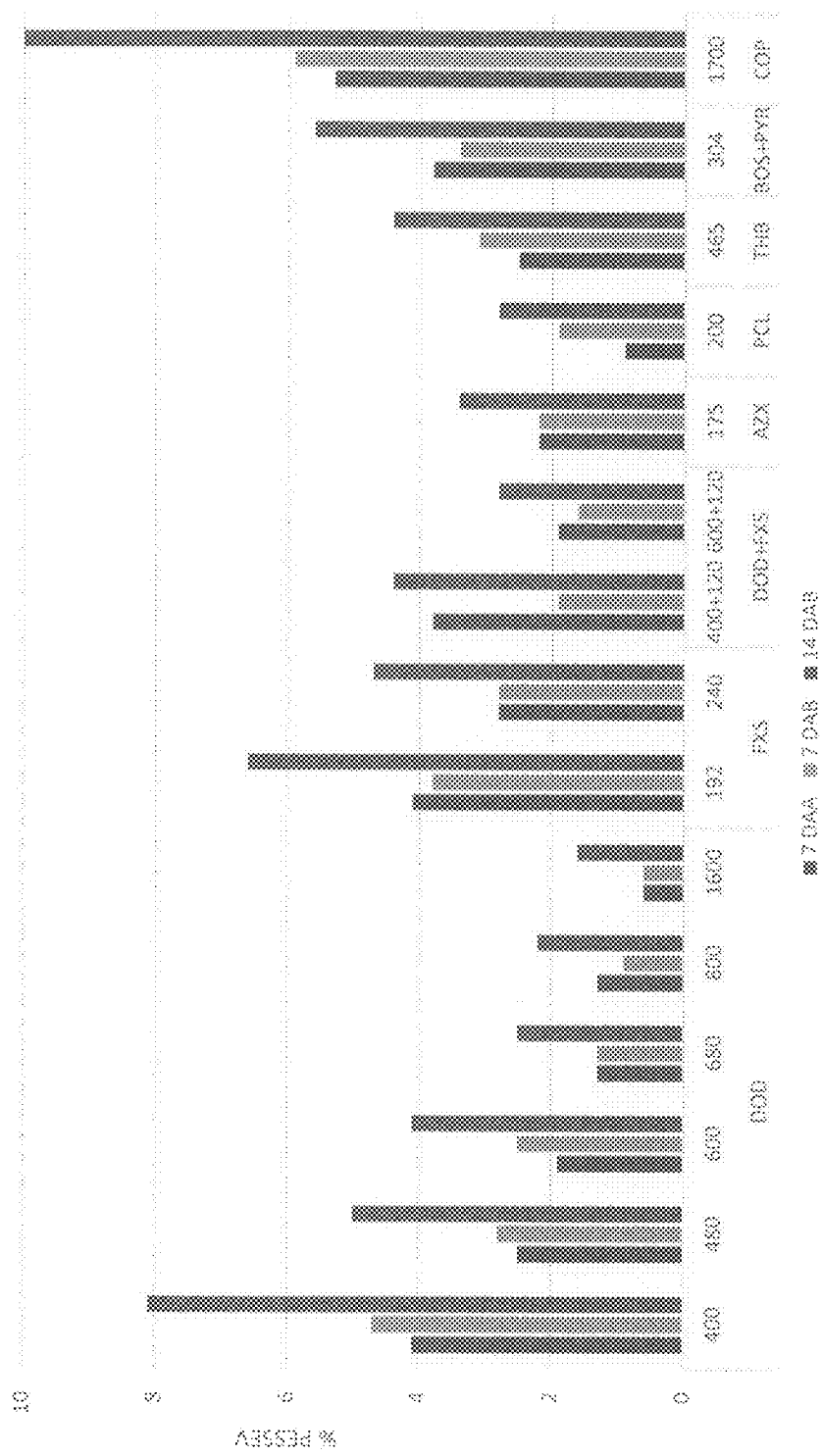
FIG. 9 depicts mango disease incident results on leaves at a second location.
Figure 10:
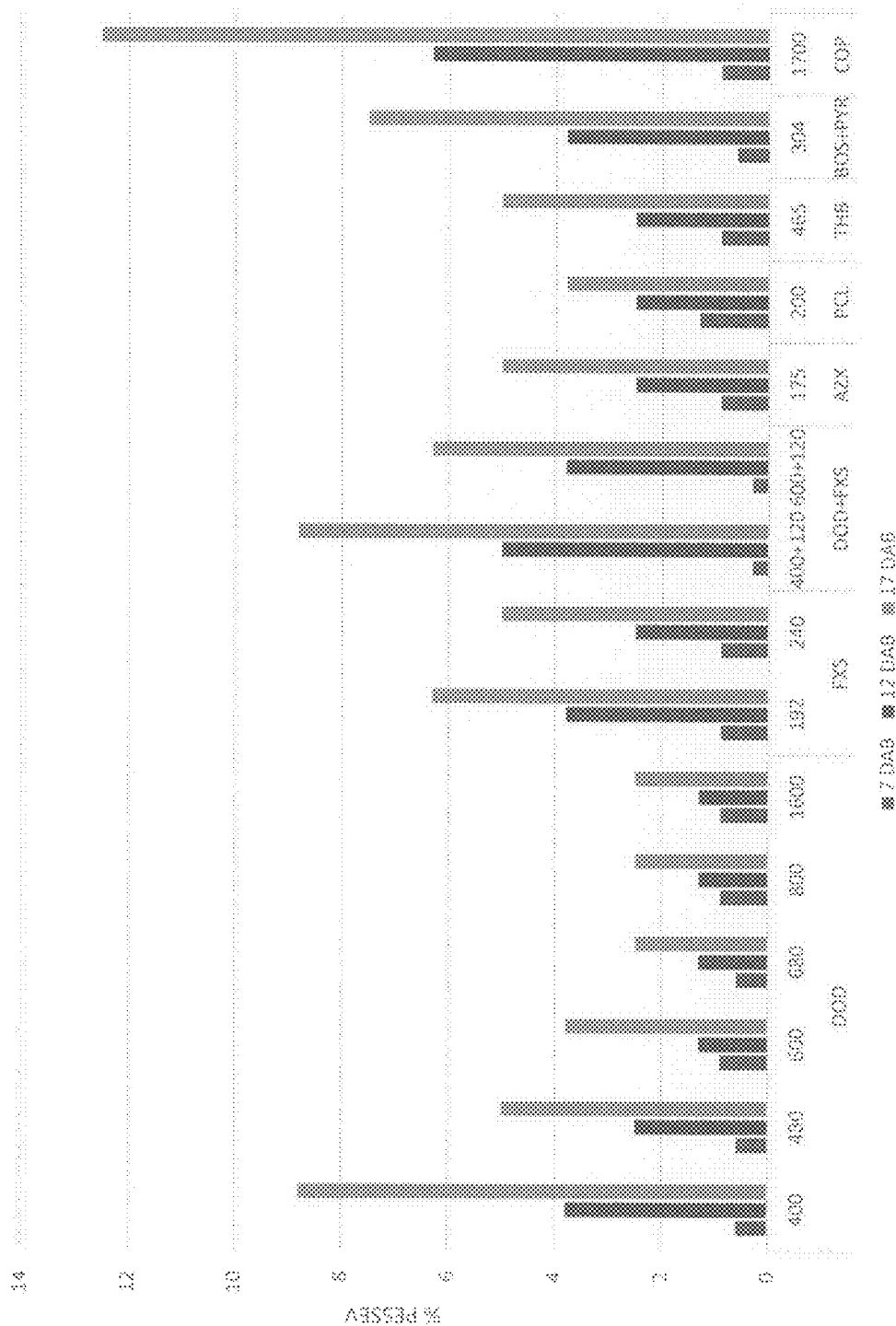
FIG. 10 depicts mango disease incident results on fruits at a second location.

The disease incident results on flowers at the first location are shown in FIG. 6, and the disease incident results on fruits at the first location are shown in FIG. 7 for each application of fungicide. FIGS. 8, 9 and 10 show the disease incident results on flowers, leaves and fruits respectively at the second location for each application of fungicide.

The results are shown at 7 days after the first application, 7 days after the second application and 14 days after the second application. At 0 days, all of the treatments showed similar disease presence and there were no significant differences between the different treatments.

As seen in FIGS. 6-10, various concentrations of dodine had a positive effect on the disease incident results on mango fruits and flowers at both locations and on the leaves at the second location.

Example 3

A trial protocol was conducted on avocado plants using a dodine suspension concentrate (400SC) with a water volume of 1200 L/ha. The trials were conducted at two locations.

The first foliar spray of dodine was applied at the start of flowering under climatic conditions favorable to the disease (i.e., wet, humid, and/or warm weather conditions) and the second foliar spray was applied 7 days later.

Assessments were taken at 0 days, 7 days after the first foliar spray, 7 days after the second foliar spray and 14 days after the second foliar spray. The plants were assessed for disease increase/severity on flowers to predict yield loss, disease severity on leaves, disease severity on fruits and phytotoxicity according to the scale provided in Table 3.

Figure 11:
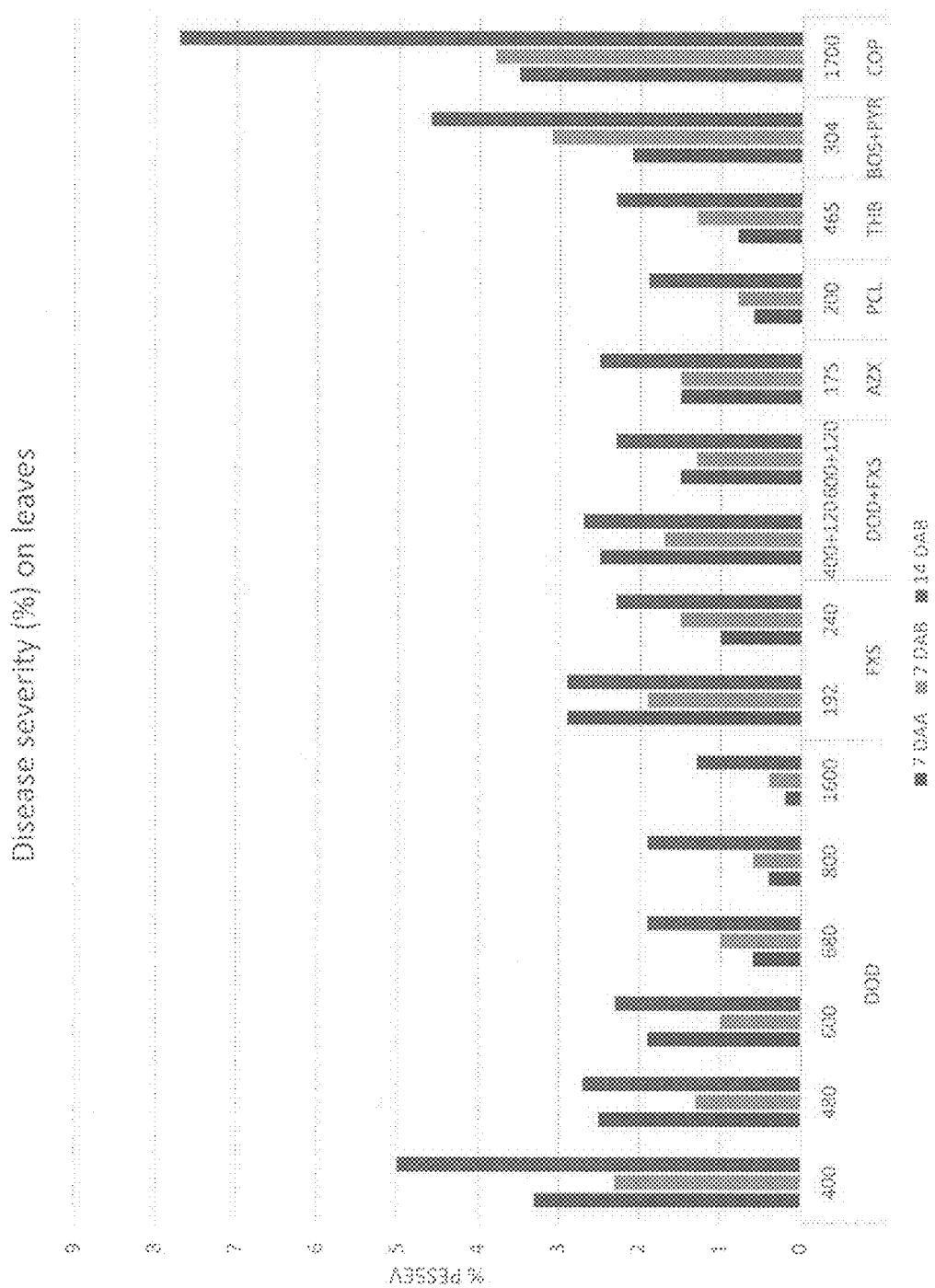
FIG. 11 depicts avocado disease incident results on leaves at a first location.
Figure 12:
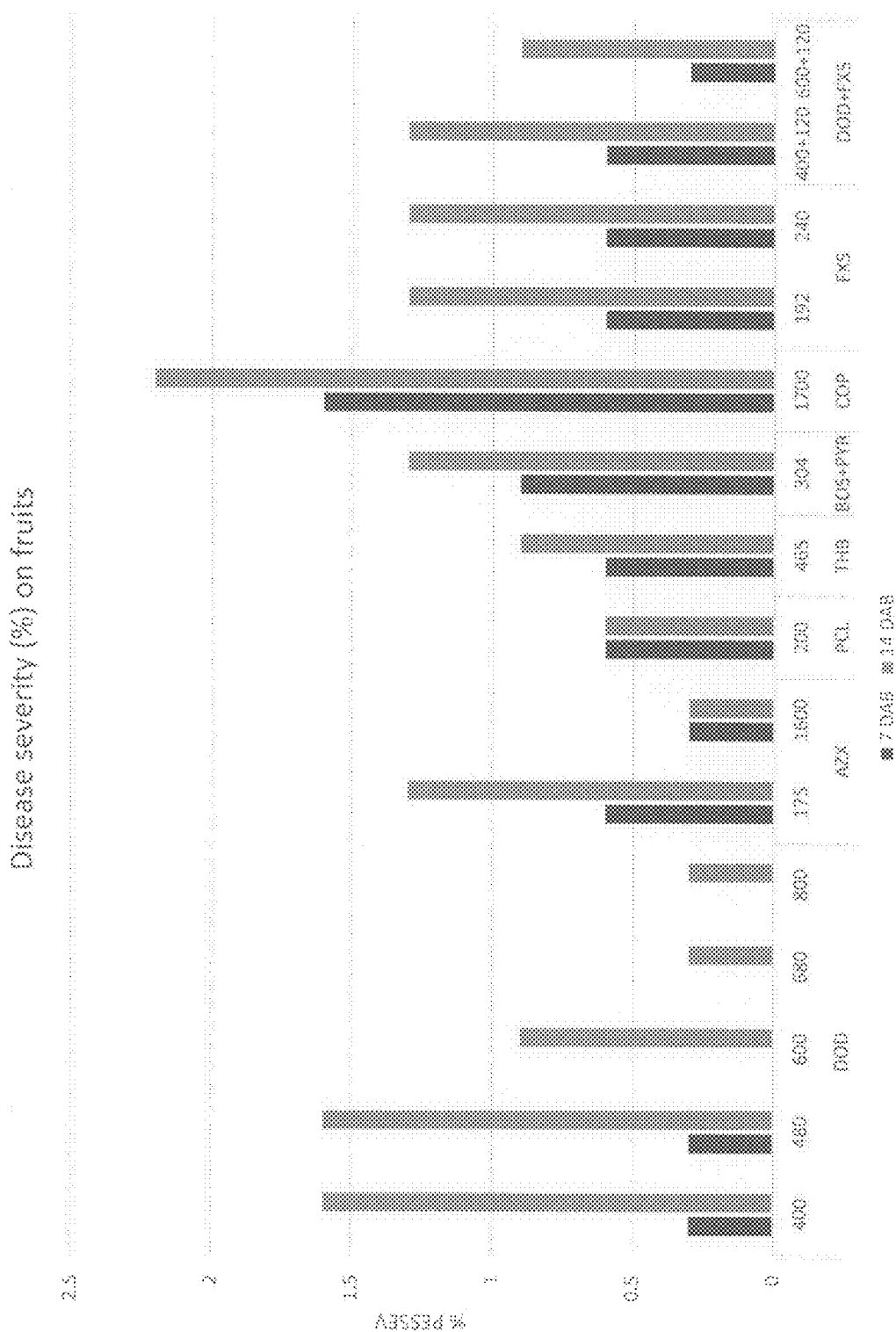
FIG. 12 depicts avocado disease incident results on fruits at a first location.
Figure 13:
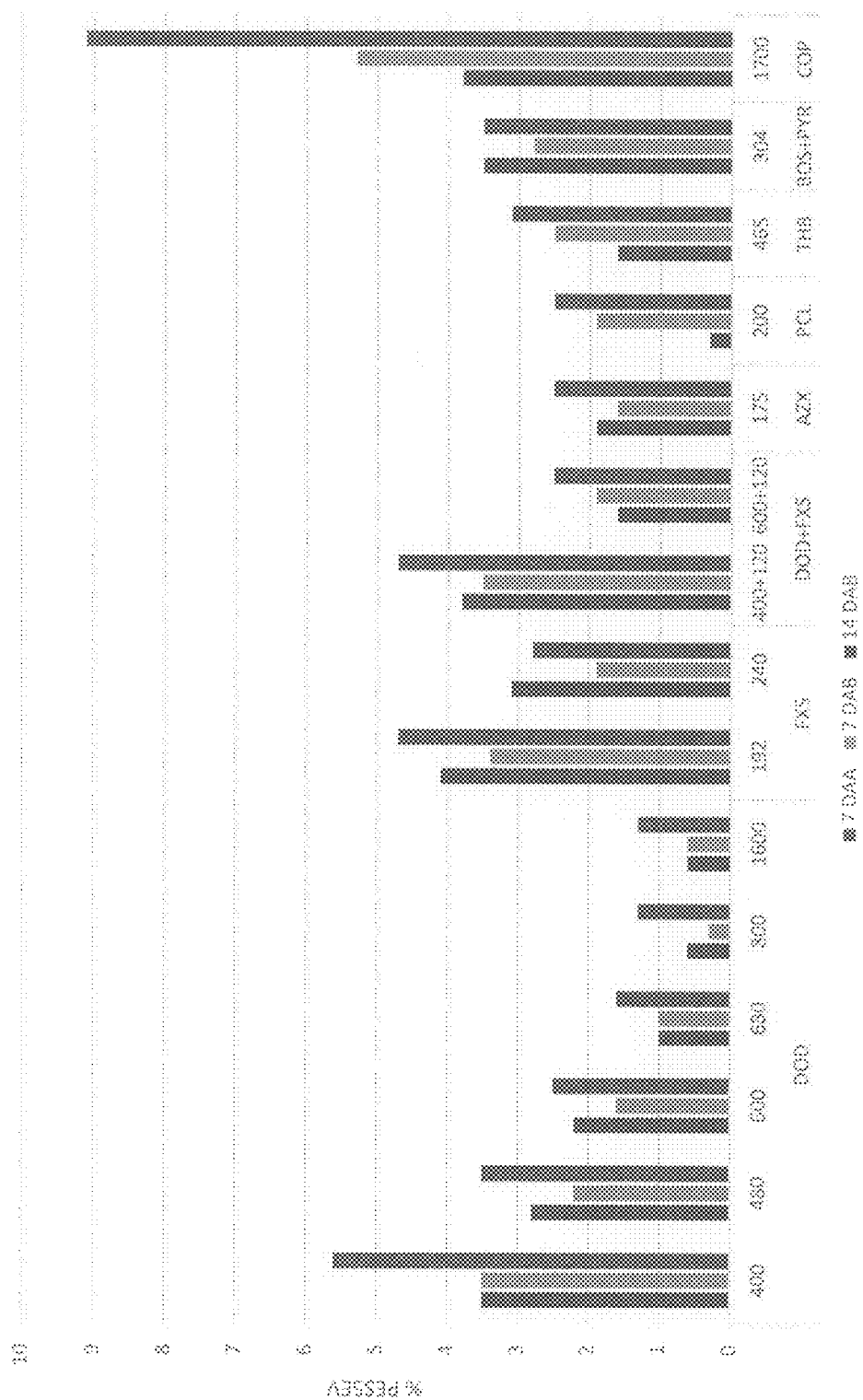
FIG. 13 depicts avocado disease incident results on flowers at a second location.

The disease incident results on leaves at the first location are shown in FIG. 11, and the disease incident results on fruits at the first location are shown in FIG. 12 for each application of fungicide. FIG. 13 shows the disease incident results on flowers at the second location for each application of fungicide.

The results are shown at 7 days after the first application, 7 days after the second application and 14 days after the second application. At 0 days, all of the treatments showed similar disease presence and there were no significant differences between the different treatments.

As seen in FIGS. 11-13, various concentrations of dodine had a positive effect on the disease incident results on avocado fruits and flowers at both locations and on the leaves at the second location.

An application interval of 5 days or 7 days or 10 days or 14 days can be used to provide good results. In addition, it is desirable that the application of the composition be applied at least once or at least twice or more. Thus, in one embodiment, the agrochemical composition may be applied at flowering for flower and leaf protection. Alternatively, the agrochemical composition may be applied early post-flowering for direct fruit protection. In addition, for some tropical crops, a copper oxychloride spray can be applied prior to flowering and then the agrochemical composition containing the guanidine or salt or solvate thereof applied at the start of flowering.

Finally, it should also be understood that the following claims are intended to cover all of the generic and specific features of the invention described herein and all statements of the scope of the invention that as a matter of language might fall there between.

What is claimed is:

1. A method of treating a mango, papaya, or avocado plant or cultivar susceptible to anthracnose caused by *Colletotrichum*, the method consisting of:
    a) contacting the mango, papaya or avocado plant or a part or locus thereof with an agrochemical composition applied at a rate of dodine application of 150 to 2,000 g/ha, either at flowering or early post-flowering, the agrochemical composition consisting of
    the dodine,
    optionally one or more agriculturally acceptable auxiliaries, selected from the group consisting of solvents, surfactants, stabilizers, anti-foaming agents, anti-freezing agents, preservatives, antioxidants, colorants, thickeners, inert fillers, and combinations thereof; and
    optionally one or more additional fungicides are selected from the group consisting of neem oil, mono- and di-potassium salts of phosphorous acid, basic copper sulfate, copper sulfate pentahydrate, copper hydroxide, mancozeb, chlorothalonil, harpin protein, copper salts of fatty and rosin acids, azoxystrobin, cuprous oxide, *Reynoutria sachalinensis*, a monopotassium salt of carbonic acid, Fosetyl-Al, metalaxyl, strobilurin and combinations thereof; and
    b) repeating the contacting step one or more times at a fixed interval, wherein a first fixed interval is 7 to 15 days,
    wherein at 7 or 14 days after a second application, a reduction in anthracnose disease severity is observed on flowers, leaves or fruits of the plants or cultivar,
    wherein the *Colletotrichum* comprising a species of at least one of *Colletotrichum gloeosporioides* or *Colletotrichum acutatum*.

2. The method according to claim 1, wherein the dodine is in the form of a suspension concentrate.

3. The method according to claim 1, wherein the agrochemical composition is applied at a rate of 200 to 1,600 g/ha.

4. The method according to claim 1, wherein the one or more additional fungicides is a strobilurin.

5. The method according to claim 4, wherein the strobilurin is fluoxastrobin.

6. The method according to claim 1, wherein the agrochemical composition is applied more than two times.

7. The method according to claim 6, wherein a last treatment of mango, papaya or avocado fruits comprises subjecting the mango, papaya, or avocado plant or cultivar to dodine.

8. The method according to claim 1, wherein the first application is applied under conditions favorable to anthracnose wherein the conditions aretropical conditions.

9. The method of claim 1, further comprising, prior to flowering, applying a copper oxychloride spray to the mango, papaya or avocado plant or a part or locus thereof.

* * * * *